US009679566B2

(12) United States Patent
Kodaira et al.

(10) Patent No.: US 9,679,566 B2
(45) Date of Patent: Jun. 13, 2017

(54) APPARATUS FOR SYNCHRONOUSLY PROCESSING TEXT DATA AND VOICE DATA

(71) Applicant: Shinano Kenshi Kabushiki Kaisha, Ueda-shi, Nagano (JP)

(72) Inventors: Tomoki Kodaira, Ueda (JP); Tatsuo Nishizawa, Ueda (JP)

(73) Assignee: SHINANO KENSHI KABUSHIKI KAISHA, Ueda-Shi, Nagano (JP)

( * ) Notice: Subject to any disclaimer, the term of this patent is extended or adjusted under 35 U.S.C. 154(b) by 0 days.

(21) Appl. No.: 14/753,429

(22) Filed: Jun. 29, 2015

(65) Prior Publication Data

US 2015/0379996 A1 Dec. 31, 2015

(30) Foreign Application Priority Data

Jun. 30, 2014 (JP) .................................. 2014-134915

(51) Int. Cl.
*G10L 25/48* (2013.01)
*G10L 15/26* (2006.01)
(Continued)

(52) U.S. Cl.
CPC .............. *G10L 15/26* (2013.01); *G10L 25/48* (2013.01); *G10L 25/87* (2013.01); *G10L 2015/025* (2013.01)

(58) Field of Classification Search
None
See application file for complete search history.

(56) References Cited

U.S. PATENT DOCUMENTS

| 5,649,060 A * | 7/1997 | Ellozy | G06F 17/30746 369/25.01 |
| 6,260,011 B1 * | 7/2001 | Heckerman | G06F 17/30017 704/231 |

(Continued)

FOREIGN PATENT DOCUMENTS

JP 2004-170444 6/2004

OTHER PUBLICATIONS

Goldman, Jean-Philippe. "EasyAlign: an automatic phonetic alignment tool under Praat." (2011).*

*Primary Examiner* — Pierre-Louis Desir
*Assistant Examiner* — Jonathan Kim
(74) *Attorney, Agent, or Firm* — Stephen J. Weyer, Esq.; Stites & Hardison, PLLC

(57) ABSTRACT

The apparatus for synchronously processing text data and voice data, comprises: a storing unit for storing text data and voice data; a text data dividing section for dividing the text data; a text data phoneme converting section for phonemically converting the divided text data; a text data phoneme conversion accumulated value calculating section for calculating accumulated values of text data phoneme conversion values; a voice data dividing section for dividing the voice data; a reading data phoneme converting section for phonemically converting the divided voice data; a voice data phoneme conversion accumulated value calculating section for calculating accumulated values of voice data phoneme conversion values; a phrase corresponding data producing section for producing phrase corresponding data; and an output section for synchronously outputting the text data and the divided voice data.

6 Claims, 14 Drawing Sheets

(51) Int. Cl.
*G10L 15/02* (2006.01)
*G10L 25/87* (2013.01)

(56) References Cited

U.S. PATENT DOCUMENTS

| | | | | |
|---|---|---|---|---|
| 6,748,358 | B1* | 6/2004 | Iwasaki | G10L 13/00 |
| | | | | 704/258 |
| 8,903,723 | B2* | 12/2014 | Kurzweil | G09B 5/06 |
| | | | | 704/231 |
| 2005/0080633 | A1* | 4/2005 | Lueck | G10L 15/22 |
| | | | | 704/278 |
| 2006/0149558 | A1* | 7/2006 | Kahn | G10L 15/063 |
| | | | | 704/278 |
| 2006/0265220 | A1* | 11/2006 | Massimino | G10L 13/08 |
| | | | | 704/235 |
| 2009/0006087 | A1* | 1/2009 | Imoto | G10L 15/26 |
| | | | | 704/231 |
| 2011/0288861 | A1* | 11/2011 | Kurzweil | G09B 5/06 |
| | | | | 704/235 |
| 2012/0245720 | A1* | 9/2012 | Story, Jr. | G06F 3/04842 |
| | | | | 700/94 |
| 2012/0324324 | A1* | 12/2012 | Hwang | G09B 5/06 |
| | | | | 715/203 |
| 2014/0039887 | A1* | 2/2014 | Dzik | G10L 15/26 |
| | | | | 704/235 |
| 2014/0250219 | A1* | 9/2014 | Hwang | G06F 17/2827 |
| | | | | 709/224 |
| 2014/0372117 | A1* | 12/2014 | Nakata | G10L 15/26 |
| | | | | 704/235 |
| 2015/0348532 | A1* | 12/2015 | Cameron | G06F 17/30029 |
| | | | | 704/260 |

* cited by examiner

FIG.4

TEXT DATA  TD gongitsune
niiminankichi
- korewa,watashigachiisaitokini,muranomoheitoiuojii
sankarakiitaohanashidesu.mukashiwa,watashitachino
muranochikakuno,nakayamatoiutokoronichiisanaoshiro
gaatte,nakayamasamatoiuotonosamaga,oraretasoudesu.
sononakayamakara,sukoshihanaretayamanonakani,"gon
gitsune"toiukitsunegaimashita.gonwa,hitoribocchino
kogitsunede,shidanoippaishigettamorinonakanianawo
hottesundeimashita.

．
＊
。 gonwasonomamayokottobinitobidashiteisshoukenmeini,
nigeteikimashita.horaananochikakuno,hannokinoshita
defurikaettemimashitaga,hyoujuuwaokkaketewakimasen
deshita.gonwa,hottoshite,unaginoatamawokamikudaki,
yattohazushiteananosotono,kusanohanoueninoseteoki
mashita.

FIG.5

| SERIAL NUMBER | DIVIDED TEXT DATA (DTD) | NUMBER OF TEXT | NUMBER OF TEXT DATA PHONEMES (TON) | TEXT DATA PHONEME CONVERSION ACCUMULATED VALUE (TN) |
|---|---|---|---|---|
| 1 | gongitsune | 5 | 5 | 31 |
| 2 | niminankichi | 7 | 8 | 81 |
| 3 | - | 2 | 2 | 93 |
| 4 | korewa, | 3 | 3 | 112 |
| 5 | watashigachiisaitokini, | 11 | 12 | 187 |
| 6 | muranomoheitoiuojiisankarakiitaohanashidesu. | 25 | 26 | 350 |
| 7 | mukashiwa, | 4 | 4 | 375 |
| 8 | watashitachinomuranochikakuno, | 13 | 13 | 456 |
| 9 | nakayamatoiutokoronichiisanaoshirogaatte, | 22 | 23 | 600 |
| 10 | nakayamasamatoiuotonosamaga, | 15 | 15 | 694 |
| 11 | oraretasoudesu. | 8 | 9 | 750 |
| 12 | sononakayamakara, | 8 | 8 | 801 |
| 13 | sukoshihanaretayamanonakani, | 13 | 13 | 882 |
| 14 | "gongitsune"toiukitsunegaimashita. | 16 | 16 | 982 |
| 15 | gonwa, | 3 | 3 | 1001 |
| 16 | hitoribocchinokogitsunede, | 12 | 12 | 1076 |
| 17 | shidanoippaishigettamorinonakanianawohottesundeimashita. | 30 | 30 | 1264 |
| ... | ... | ... | ... | ... |
| 123 | gonwasonomamayokottobinitobidashite | 18 | 18 | 9267 |
| 124 | isshoukenmeini,nigeteikimashita. | 17 | 19 | 9386 |
| 125 | horaananochikakuno, | 9 | 9 | 9443 |
| 126 | hannokinoshitadefurikaettemimashitaga, | 19 | 19 | 9561 |
| 127 | hyoujuwaokaketewakimasendeshita. | 18 | 20 | 9687 |
| 128 | gonwa,hottoshite, | 8 | 8 | 9737 |
| 129 | unaginoatamawokamikudaki, | 13 | 13 | 9818 |
| 130 | yattohazushiteananosotono, | 13 | 13 | 9899 |
| 131 | kusanohanoueninoseteokimashita. | 16 | 16 | 10000 |

FIG.7

| SERIAL NUMBER | DIVIDED VOICE DATA (DSD) | NUMBER OF TEXT | NUMBER OF VOICE DATA PHONEMES (SON) | VOICE DATA PHONEME CONVERSION ACCUMULATED VALUE (SN) |
|---|---|---|---|---|
| 1 | onshitsunen | 6 | 6 | 37 |
| 2 | niimi7kichi | 7 | 8 | 87 |
| 3 | i | 2 | 2 | 100 |
| 4 | korewa | 3 | 3 | 119 |
| 5 | watashigachiisaitokini | 11 | 12 | 194 |
| 6 | muranomoheitoiojiisankara | 15 | 16 | 294 |
| 7 | kiitaohanashidesu | 9 | 9 | 351 |
| 8 | mukashiwa | 4 | 4 | 376 |
| 9 | watashitachinomuranochikakuno | 13 | 13 | 457 |
| 10 | nakayamatoiutokoronichiisanaoshirogaaru | 21 | 22 | 595 |
| 11 | kome | 2 | 2 | 608 |
| 12 | nakayamasamatoiuotonosamaga | 15 | 15 | 702 |
| 13 | woraretasoudesu | 8 | 8 | 752 |
| 14 | sononakayamakara | 8 | 8 | 802 |
| 15 | sukoshihanaretayamanonakani | 13 | 13 | 884 |
| 16 | kongetsume | 5 | 5 | 915 |
| 17 | toiukitsunenaimashita | 11 | 11 | 984 |
| 18 | gonwa | 3 | 3 | 1003 |
| 19 | hitoribocchinokogitsunede | 12 | 12 | 1078 |
| 20 | shinanoippaishigettamorinonakani | 17 | 17 | 1184 |
| 21 | anawohottesusundeimashita | 14 | 14 | 1272 |
| ... | ... | ... | ... | ... |
| 123 | 5sonomamayokottobinitobidashite | 16 | 16 | 9253 |
| 124 | isshoukenmeininigeteikimashita | 17 | 19 | 9373 |
| 125 | horaa7chikakuno | 9 | 10 | 9435 |
| 126 | fannokinoshitadefurikaettemimashitaga | 19 | 19 | 9554 |
| 127 | shoujuuwokaketewakimasendeshita | 16 | 18 | 9667 |
| 128 | gonwahon | 5 | 5 | 9699 |
| 129 | toshite | 3 | 3 | 9717 |
| 130 | unaginoatamawokamikudaki | 13 | 13 | 9799 |
| 131 | yattoASshite | 9 | 10 | 9862 |
| 132 | ananosotono | 6 | 6 | 9899 |
| 133 | kusanohanoueninoseteokimashita | 16 | 16 | 10000 |

FIG. 10

| | TEXT DATA SIDE (TT / DTD) | | VOICE DATA SIDE (ST / DSD) | |
|---|---|---|---|---|
| SERIAL NUMBER | DIVIDED TEXT DATA | | SERIAL NUMBER | DIVIDED VOICE DATA |
| 1 | gongitsune | | 1 | onshitsunen |
| 2 | niiminankichi | | 2 | niimi7kichi |
| 3 | - | | 3 | i |
| 4 | korewa, | | 4 | korewa |
| 5 | watashigachiisaitokini, | | 5 | watashigachiisaitokini |
| 6 | muranomoheitouojiisankarakiitachanashidesu. | | 6-7 | muranomoheitoiojiisankarakiitachanashidesu |
| 7 | mukashiwa, | | 8 | mukashiwa |
| 8 | watashitachinomuranochikakuno, | | 9 | watashitachinomuranochikakuno |
| 9 | nakayamatoiutokoronichiisanaoshirogaatte, | | 10 | nakayamatoiutokoronichiisanaoshirogaaru |
| 10 | nakayamasamatoiuotonosamaga, | | 11-12 | komenakayamasamatoiuotonosamaga |
| 11 | oraretasoudesu. | | 13 | woraretasoudesu |
| 12 | sononakayamakara, | | 14 | sononakayamakara |
| 13 | sukoshihanaretayamanonakani, | | 15 | sukoshihanaretayamanonakani |
| 14 | "gongitsune"toiukitsunegaimashita. | | 16-17 | kongetsumetoiukitsuneaimashita |
| 15 | gonwa, | | 18 | gonwa |
| 16 | hitoribocchinokogitsunede, | | 19 | hitoribocchinokogitsunede |
| 17 | shidanoippaishigettamorinonakanianawohottesusundeimashita. | | 20-21 | shinanoippaishigettamorinonakanianawohottesusundeimashita |
| ... | ... | | ... | ... |
| 123 | gonwasonomamayokottobinitobidashite | | 123 | 5sonomamayokottobinitobidashite |
| 124 | isshoukenmeini, nigeteikimashita. | | 124 | isshoukenmeininigeteikimashita |
| 125 | horaanochikakuno, | | 125 | horaa7chikakuno |
| 126 | hannokinoshitadefurikaettemimashitaga, | | 126 | fannokinoshitadefurikaettemimashitaga |
| 127 | hyoujuuwokaketewakimasendeshita. | | 127-128 | shoujuuwokaketewakimasendeshitagonwahon |
| 128 | gonwa, bottoshite, | | 129 | toshite |
| 129 | unaginoatamawokamikudaki, | | 130 | unaginoatamawokamikudaki |
| 130 | yattohazushiteananosotono, | | 131-132 | yattoASshiteananosotono |
| 131 | kusanohanoueninoseteokimashita. | | 133 | kusanohanoueninoseteokimashita |

FIG.12A
PHRASE CORRESPONDING DATA
BEFORE RESETTING PROCESS

| TT | DTD | TN |
|---|---|---|
| DIVIDED TEXT DATA | | |
| SERIAL NUMBER | TEXT DATA PHONEME CONVERSION ACCUMULATED VALUE | |
| 1 | 263 | |
| 2 | 825 | |
| 3 | 1016 | |
| 4 | 1136 | |
| 5 | 1435 | |
| 6 | 1483 | |
| 7 | 1734 | |
| 8 | 1961 | |
| 9 | 2332 | |
| 10 | 2452 | |

| ST | DSD | SN |
|---|---|---|
| DIVIDED VOICE DATA | | |
| SERIAL NUMBER | VOICE DATA PHONEME CONVERSION ACCUMULATED VALUE | |
| 1 | 73 |
| 2 | 280 |
| 3 | 316 |
| 4 | 426 |
| 5 | 462 |
| 6 | 511 |
| 7 | 535 |
| 8 | 682 |
| 9 | 889 |
| 10 | 1035 |
| 11 | 1071 |
| 12 | 1157 |
| 13 | 1327 |
| 14 | 1461 |
| 15 | 1550 |
| 16 | 1583 |
| 17 | 1717 |
| 18 | 1741 |
| 19 | 1973 |
| 20 | 2046 |
| 21 | 2350 |
| 22 | 2472 |
| 23 | 2557 |

FIG.12B
DATA EXTRACTED FROM
RESETTING SEGMENT
BY USING "MJD2"

| SST | DSD | SON2 | SSN |
|---|---|---|---|
| DIVIDED VOICE DATA (VOICE DATA IN RESETTING SEGMENT) | | | |
| SECOND SERIAL NUMBER | VOICE DATA PHONEME CONVERSION VALUE | VOICE DATA PHONEME CONVERSION ACCUMULATED VALUE | |
| 1 | 134 | 134 | |
| 2 | 39 | 173 | |
| 3 | 50 | 223 | |

FIG.12C
DIVIDED VOICE DATA
CORRECTED IN THE
RESETTING SEGMENT

| ST2 | DSD | SN2 |
|---|---|---|
| DIVIDED VOICE DATA | | |
| NEW SERIAL NUMBER | VOICE DATA PHONEME CONVERSION ACCUMULATED VALUE | |
| 13 | 1327 | |
| 14 | 1461 | |
| 15 | 1500 | ← SEPARATING POSITION ADDED BY RESETTING PROCESS |
| 16 | 1550 | |

FIG.13

| CORRECTED PHRASE CORRESPONDING DATA —MFD | | | | | |
|---|---|---|---|---|---|
| | TT | DTD | TN | ST | DSD | SN |

| | DIVIDED TEXT DATA | | DIVIDED VOICE DATA | |
|---|---|---|---|---|
| SERIAL NUMBER | TEXT DATA PHONEME CONVERSION ACCUMULATED VALUE | SERIAL NUMBER | VOICE DATA PHONEME CONVERSION ACCUMULATED VALUE |
| 1 | 263 | 1 | 73 |
| 2 | 825 | 2 | 280 |
| 3 | 1016 | 3 | 316 |
| 4 | 1136 | 4 | 426 |
| 5 | 1435 | 5 | 462 |
| 6 | 1483 | 6 | 511 |
| 7 | 1734 | 7 | 535 |
| 8 | 1961 | 8 | 682 |
| 9 | 2332 | 9 | 889 |
| 10 | 2452 | 10 | 1035 |
| | | 11 | 1071 |
| | | 12 | 1152 |
| | | 13 | 1327 |
| | | 14 | 1461 |
| | | 15 | 1500 |
| | | 16 | 1550 |
| | | 17 | 1583 |
| | | 18 | 1717 |
| | | 19 | 1741 |
| | | 20 | 1973 |
| | | 21 | 2046 |
| | | 22 | 2350 |
| | | 23 | 2477 |
| | | 24 | 2557 |

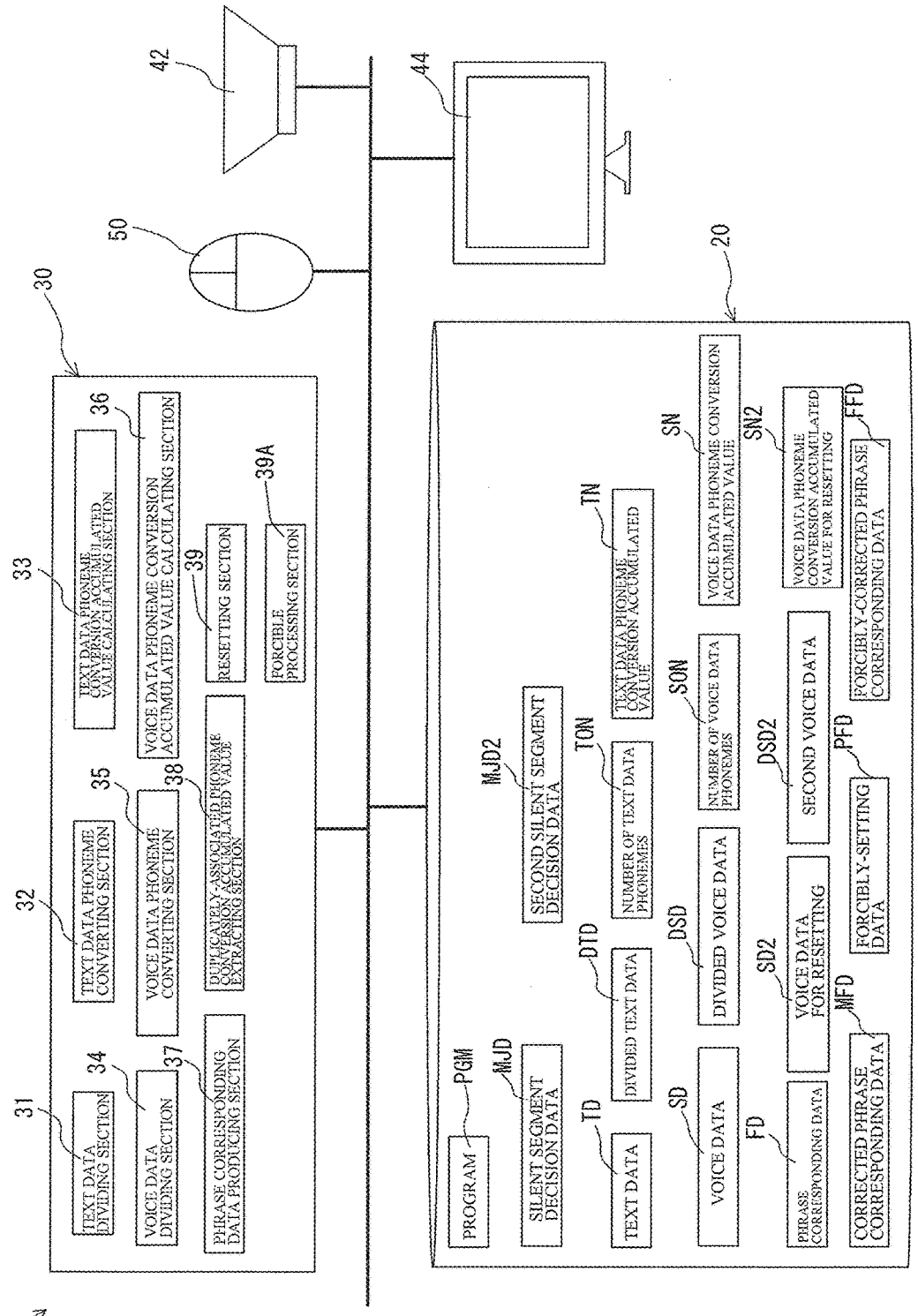

FIG.15A
DATA EXTRACTED FROM CORRECTED
PHRASE CORRESPONDING DATA

| | TT | | | ST | SN |
|---|---|---|---|---|---|
| | SERIAL NUMBER | TEXT DATA PHONEME CONVERSION ACCUMULATED VALUE | | SERIAL NUMBER | VOICE DATA PHONEME CONVERSION ACCUMULATED VALUE |
| | 12 | 600 | | 16 | 598 |
| | 13 | 700 | | 17 | 798 |
| | 14 | 800 | | 18 | 920 |
| | ... | ... | | ... | ... |

BOTH OF SERIAL NUMBERS "TT=13 AND 14 BEING DUPLICATELY ASSOCIATED WITH SERIAL NUMBER "ST=17"

FIG.15B
PART OF FORCIBLY-CORRECTED
PHRASE CORRESPONDING DATA

| | TN | | | ST | SN |
|---|---|---|---|---|---|
| | SERIAL NUMBER | TEXT DATA PHONEME CONVERSION ACCUMULATED VALUE | | SERIAL NUMBER | VOICE DATA PHONEME CONVERSION ACCUMULATED VALUE |
| | 12 | 600 | | 16 | 598 |
| | 13 | 700 | | 17 | 698 |
| | 14 | 800 | | 18 | 798 |
| | | | | 19 | 920 |
| | ... | ... | | ... | ... |

DUPLICATION BEING ELIMINATED
DUPLICATION BEING ELIMINATED

APPARATUS FOR SYNCHRONOUSLY PROCESSING TEXT DATA AND VOICE DATA

CROSS-REFERENCE TO RELATED APPLICATION

This application is based upon and claims the benefit of priority of the prior Japanese Patent Application No. 2014-134915, filed on Jun. 30, 2014, and the entire contents of which are incorporated herein by reference.

FIELD

The present invention relates to an apparatus for automatically synchronously processing text data and voice data.

BACKGROUND

To produce an electronic book which is capable of displaying text data and playbacking voice data in a state where the both data are corresponded to each other, the text data and the voice data must be synchronously processed.

Usually, the text data are shown on a display and the voice data are outputted from a speaker, and the both data are manually synchronized. Therefore, a working efficiency of synchronously processing the text data and the voice data is very low, so it is difficult to generalize accessible electronic books.

These days, a technology for automatically synchronously processing text data and voice data has been proposed (see Patent Document 1).

PRIOR ART DOCUMENTS

Patent Document 1: Japanese Laid-open Patent Publication No. 2004-170444

SUMMARY

In the technology disclosed in Patent Document 1, text data corresponding to a content of voice data are displayed on the basis of elapsed time of outputting the voice data. In case that the voice data are outputted at a constant reading speed, the text data can be desirably synchronized with the voice data. However, in case that the reading speed of the voice data is varied or in case that silent data are interposed in the voice data, quality of the synchronous processing must be low.

The present invention has been invented to solve the above described problem of the conventional technology.

Accordingly, a first object of the present invention to provide an apparatus for automatically synchronously processing text data and voice data, in which voice data and text data can be suitably synchronized even in case that a reading speed of the voice data is varied or in case that a lot of silent data are interposed in the voice data.

A second object is to provide an apparatus for automatically synchronously processing text data and voice data, which is capable of performing the synchronous processing in a short time.

To achieve the objects, the inventor studied and conceived the present invention.

Namely, the apparatus for synchronously processing text data and voice data, comprises:

a storing unit for storing text data constituted by a plurality of phrases and voice data of the text data;

a text data dividing section for dividing the text data stored in the storing unit into the phrases and storing the divided text data, with identifiers which respectively correspond to the divided text data and indicate the division order, in the storing unit;

a text data phoneme converting section for phonemically converting the divided text data, phrase by phrase, to obtain text data phoneme conversion values and storing the text data phoneme conversion values, which respectively correspond to the phrases, in the storing unit;

a text data phoneme conversion accumulated value calculating section for calculating accumulated values of the text data phoneme conversion value of each phrase of the divided text data and storing the accumulated values, which respectively correspond to the phrases of the divided text data, in the storing unit;

a voice data dividing section for extracting a silent segment, from the voice data, on the basis of a predetermined silent segment decision datum, dividing the voice data in the extracted silent segment, and storing the divided voice data, with identifiers which respectively correspond to the divided voice data and indicate the division order, in the storing unit;

a reading data phoneme converting section for phonemically converting the divided voice data, which have been divided division range by division range, to obtain voice data phoneme conversion values and storing the voice data phoneme conversion values, which respectively correspond to the division ranges, in the storing unit;

a voice data phoneme conversion accumulated value calculating section for calculating accumulated values of the voice data phoneme conversion value of each division range of the divided voice data and storing the accumulated values, which respectively correspond to the division ranges of the divided voice data, in the storing unit;

a phrase corresponding data producing section for extracting the nearest approximate values of the voice data phoneme accumulated values with respect to the text data phoneme conversion accumulated values corresponding to the phrases of the divided text data, and producing phrase corresponding data, in which the voice data phoneme conversion accumulated values respectively corresponding to the phrases of the divided text data are associated with identifiers indicating playback order of the phrases of the divided text data; and an output section for outputting the corresponding phrases of the text data and the divided voice data, which correspond to each other, on the basis of the phrase corresponding data.

With this structure, the synchronous processing of the text data and the voice data corresponding to the text data can be automatically performed. Further, even in case that a reading speed of the voice data is varied or in case that a lot of silent data are interposed in the voice data, the synchronous processing of the text data and the voice data can be performed in a short time.

Preferably, the apparatus further comprises:

a duplicately-associated phoneme conversion accumulated value extracting section for detecting existence of duplicate association of the voice data phoneme conversion accumulated values in the phrase corresponding data; and a resetting section for resetting the phrase corresponding data so as to eliminate the duplicate association of the voice data phoneme conversion accumulated values in the phrase corresponding data, and the resetting section defines all of the divided voice data, whose voice data phoneme conversion accumulated values are duplicately-associated, as resetting segment data when the duplicate association of the voice data phoneme conversion accumulated values is detected, the resetting section performs:
- a process of extracting a second silent segment, from the resetting segment data, on the basis of a second silent segment decision datum whose condition is more restricted than that of the silent segment decision datum;
- a process of producing second divided voice data, which are obtained by dividing the resetting segment data on the basis of a result of extracting the second silent segment;
- a process of calculating second phoneme conversion values, which are obtained by phonemically converting the divided segments of the second divided voice data, and calculating a voice data phoneme conversion accumulated value of the resetting segment data, which is accumulated, in division order, in the resetting segment data;
- a process of extracting the nearest approximate values of the voice data phoneme conversion accumulated values of the resetting segment data with respect to the text data phoneme conversion accumulated values corresponding to the phrases of the divided text data in the resetting segment data, and making the extracted values correspond to the phrases of the divided text data in the resetting segment data;
- a process of producing phrase corresponding data of the resetting segment, in which accumulated values of the divided voice data phoneme conversion in the resetting segment data are respectively corresponded to the phrases of the divided text data in the resetting segment data; and
- a process of producing corrected phrase corresponding data by integrating the phrase corresponding data with the phrase corresponding data of the resetting segment on the basis of the identifiers in the divided text data.

With this structure, even in case that a set value of the silent segment decision data cannot be adapted to contents of the voice data and the silent segment is not suitably extracted from the voice data, only a part of the voice data where the silent segment exists can be treated as the resetting segment data. Therefore, as to the segments where the voice data are suitably divided, the data need not be reprocessed, so that the synchronous processing of the text data and the voice data can be performed, in a short time, with higher accuracy than before.

Preferably, further comprises a forcible processing section, and when the duplicately-associated phoneme conversion accumulated value extracting section detects the duplicate association of the voice data phoneme conversion accumulated values of the resetting segment data in the corrected phrase corresponding data, the forcible processing segment performs:
- a process of producing forcible processing object data, which include the voice data phoneme conversion accumulated value of the resetting segment data from which the duplicate association has been detected by the duplicately-associated phoneme conversion accumulated value extracting section, the second divided voice data being corresponded thereto and the divided text data;
- a process of calculating a total value of the text data phoneme conversion values of the divided text data of the forcible processing object data, and calculating a ratio of the text data phoneme conversion values of the divided text data of the forcible processing object data to the total value;
- a process of forming forcibly-divided segments in the second voice data according to the calculated ratio of the text data phoneme conversion values, and calculating voice data phoneme conversion accumulated values of the resetting segments in the forcibly-divided segments;
- a process of extracting voice data phoneme conversion accumulated values of the forcible process object data, each of which is the nearest to the text data phoneme conversion accumulated values of the phrases of the divided text data in the forcible process object data, and making the extracted values correspond to the phrases of the divided text data in the forcible process object data;
- a process of producing phrase corresponding data of the forcible process object data, in which the voice data phoneme conversion accumulated values in the forcible process object data are respectively associated with the phrases of the divided text data in the forcible process object data; and
- a process of producing forcibly-corrected phrase corresponding data by integrating the phrase corresponding data, the phrase corresponding data in the resetting segments and the phrase corresponding data in the forcible process object data on the basis of the identifiers in the divided text data.

With this structure, in case that no silent segment is extracted, from a part of the voice data where the silent segment originally exists, by performing the resetting process, the silent segment can be forcibly produced in the voice data on the basis of punctuation marks of phrases obtained from the text data. Therefore, the text data and the voice data can be automatically correctly synchronized.

Preferably, the voice data phoneme conversion accumulated value calculating section converts the voice data into text data once by voice recognition processing, and phonemically converts the text data of the voice data.

With this structure, the voice data are converted into text data once, so that the voice data can be correctly phonemically converted. Therefore, accuracy of the synchronous processing of the text data and the voice data can be further increased.

In the apparatus of the present invention, the synchronous processing of the text data and the reading data can be automatically performed with high accuracy. Since the text data include information relating to positions of regular punctuation marks, the synchronous processing of the text data and the reading data can be automatically performed, in a short time, with high accuracy, even if a reading speed of the voice data is varied or silent data are interposed in the voice data.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Embodiments of the present invention will now be described by way of examples and with reference to the accompanying drawings which are given by way of illustration only, and thus are not limitative of the present invention, and in which:

FIG. 4 is an explanation table showing contents of the text data dealt in the embodiment;

FIG. 5 is an explanation table showing contents of divided text data, which are produced by dividing the text data into phrases;

FIG. 7 is a an explanation table showing output contents of the text data, which are obtained by voice-processing divided voice data, which are produced by dividing the voice data on the basis of silent segment decision data;

FIG. 10 is an explanation table showing phrase corresponding data;

FIG. 12A is an explanation table showing a main part of divided text data table, which is used for resetting synchronizing positions in the second embodiment;

FIGS. 12B and 12C are explanation tables showing main parts of divided voice data table, which are used for resetting the synchronizing positions in the second embodiment;

FIG. 13 shows an explanation table showing the divided text data table and the divided voice data table after resetting;

FIG. 14 is a block diagram of an apparatus of a third embodiment, which is capable of synchronously processing text data and voice data, showing a schematic structure; and FIGS. 15A and 15B show an example of forcibly-corrected phrase corresponding data, which are used in the third embodiment and in which a forcible section forcibly sets separated segments.

DESCRIPTION OF THE EMBODIMENTS

Preferred embodiments of the apparatus for synchronously processing text data and voice data of the present invention will now be described in detail with reference to the accompanying drawings.

First Embodiment

Figure 1:
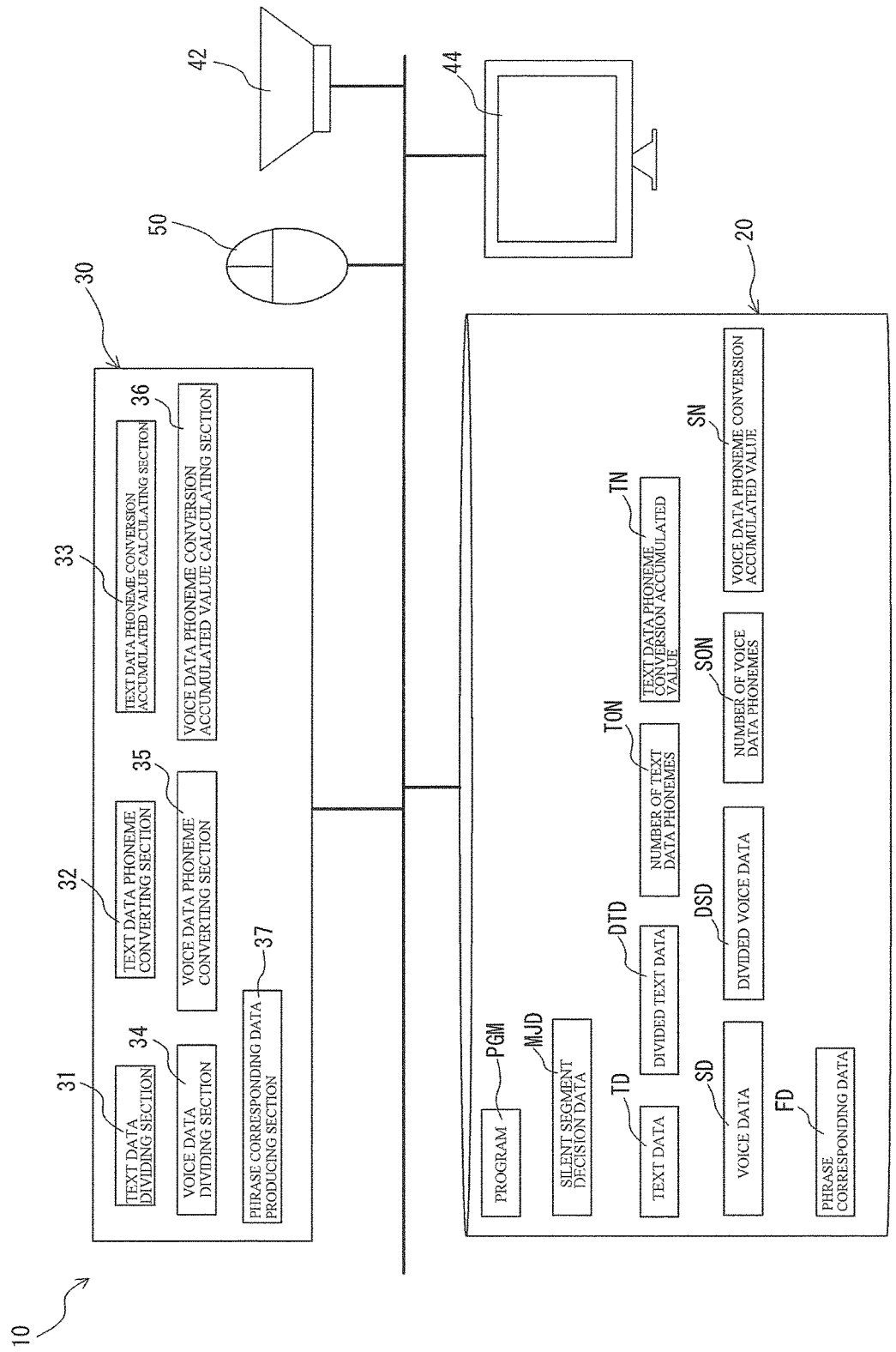
FIG. 1 is a block diagram of an apparatus of a first embodiment, which is capable of synchronously processing text data and voice data, showing a schematic structure.

A schematic structure of an apparatus 10 of the present embodiment, which is capable of synchronously processing text data and voice data, is shown in FIG. 1. Namely, the apparatus 10 includes: a storing unit 20, in which a data processing program PGM has been installed and which is capable of storing text data TD and voice data SD; and a personal computer having a CPU 30 for processing the text data TD and the voice data SD on the basis of the program PGM. The personal computer is connected to a speaker 42 and a display 44, which are capable of outputting the data stored in the storing unit 20 as data outputting means.

The CPU 30 of the personal computer has a plurality of functions for performing various types of data processing to the text data TD and the voice data SD on the basis of the program PGM. In the present specification, names and symbols corresponding to functions are assigned to processing sections for convenience of explanation, but the CPU 30 managed by the program PGM actually performs the functions of the processing sections.

The text data TD and the voice data SD are inputted to the storing unit 20 of the apparatus 10, by a user, etc., through data inputting means 50, e.g., keyboard, mouse, data storage medium reader. Note that, in the present embodiment, the voice data SD are voice data of a reader reading the text data TD, and contents of the text data TD are faithfully read.

Figure 2:
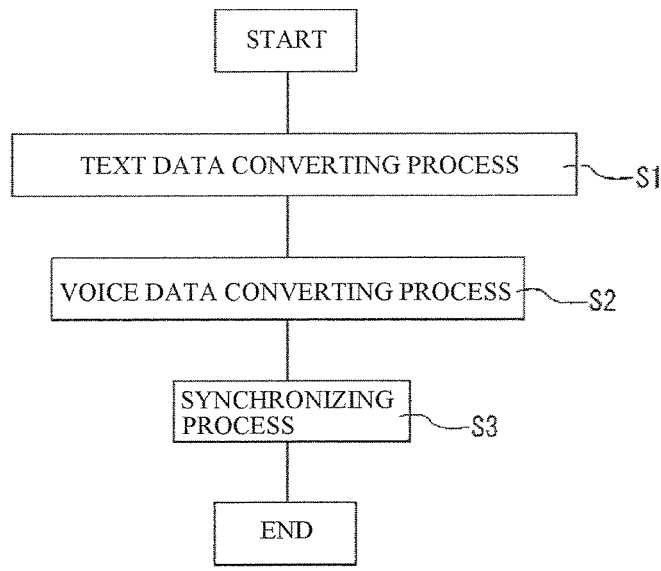
FIG. 2 is a flow chart of an example of synchronous processing performed in the apparatus of the first embodiment.

The text data TD and the voice data SD stored in the storing unit 20 of the apparatus 10 are data-processed as shown in a flow chart of FIG. 2. Concretely, the apparatus 10 performs: a process of converting the text data TD (a text data converting process S1); a process of converting the voice data SD (a voice data converting process S2); and a process of associating synchronizing positions of the text data and the voice data with the processed data (a synchronizing process S3).

Note that, order of performing the text data converting process S1 and the reading data converting process S2 may be reversed.

Figure 3:
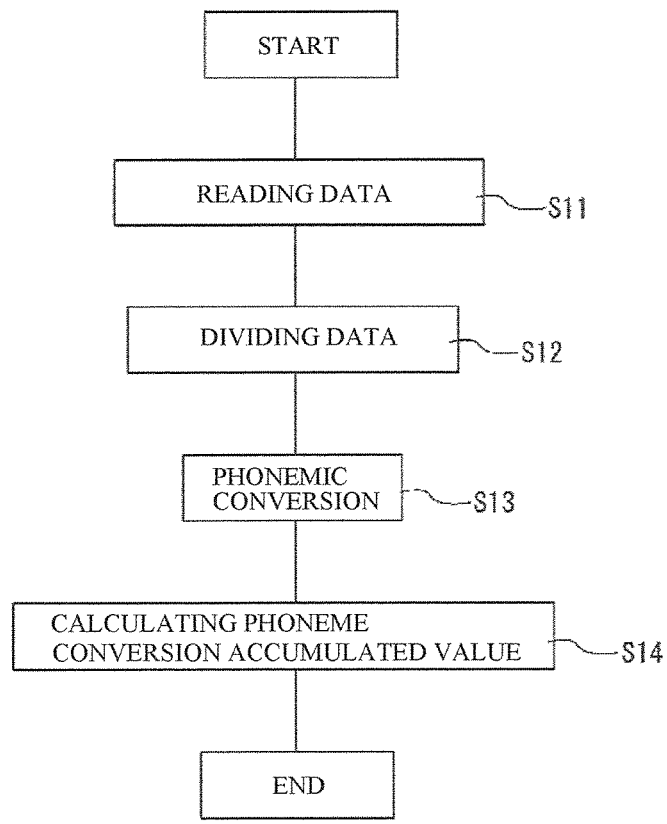
FIG. 3 is a detailed part of the flow chart shown in FIG. 2, which shows a process of converting text data.

Details of the text data converting process S1 for converting the text data TD will be explained. FIG. 3 is a flow chart showing the flow of the text data converting process.

Firstly, the CPU 30 reads the text data TD (see FIG. 4) from the storing unit 20 of the apparatus 10 through the data inputting means 50 (step S11). Usually, a plurality of phrases, each of which is a part of a sentence separated by punctuation marks, exist in the text data TD, and each of the phrases includes various types of characters, e.g., Chinese letters, Japanese letters, symbols, alphabetic letters. A main purpose of the text data converting process S1 is to convert the text data TD, which are expressed by the complicated manner, into simplified data.

A text data dividing section 31 of the CPU 30 detects punctuation marks included in the text data TD and divides the text data TD at the punctuation marks, which are regarded as separating positions of the text data TD (step S12) to obtain divided text data DTD (see FIG. 5). The divided text data DTD are stored, with serial numbers TT acting as identifiers which indicate order of dividing the text data TD, in the storing unit 20.

Next, a text data phoneme converting section 32 of the CPU 30 phonemically converts the divided text data DTD (step S13). By phonemically converting the divided text data DTD, the divided text data DTD can be expressed by phonemes. In the present embodiment, the text data are converted into Japanese syllabary, e.g., kana-letters, and one phoneme is indicated as, for example, one Japanese kana-letter. Therefore, the divided text data DTD can be expressed by the single manner, i.e., phonemes.

In the attached drawings, the converted Japanese syllabary characters, e.g., kana-letters, are further converted into alphabetic letters corresponding to Japanese pronunciation. The converted alphabetic letters are shown in FIGS. 4, 5, 7 and 10. Therefore, when counting number of the Japanese kana-letters, number of phoneme of the converted alphabetic letters shown in the drawings are counted. Note that, each of the kana-letters is converted into an alphabetic letter standing for a spoken vowel or a combination of an alphabetic letter(s) standing for a spoken consonant and an alphabetic letter standing for a spoken vowel.

Concretely, the text data phoneme converting section 32 of the present embodiment converts the divided text data DTD into phonemes, e.g., kana-letters, and counts number of the phonemes of the converted data, which are obtained by the phonemic conversion. The counted number TON of the phonemes, which is associated with the divided text data DTD of one phrase, is stored in the storing unit 20 (see FIG. 5). Note that, as to contracted sounds, assimilated sounds and long sounds which have been obtained by the phonemic conversion, e.g., kana-conversion, a counting rule which shows whether said sounds are counted as kana-letters or not may be predetermined.

Next, a text data phoneme conversion accumulated value calculating section 33 of the CPU 30 calculates a text data phoneme conversion accumulated value TN of each of the divided text data DTD on the basis of the phoneme number TON and the serial numbers TT (step S14). The text data phoneme conversion accumulated value calculating section 33 stores the text data phoneme conversion accumulated values TN, each of which corresponds to the divided text data DTD, in the storing unit 20.

In the present embodiment, the text data phoneme conversion accumulated value calculating section 33 calculates percentage of the text data phoneme conversion accumulated value TN of each of the phrases to the text data phoneme conversion accumulated value TN of the final phrase of the text data TD, to the second decimal point. Further, the text data phoneme conversion accumulated value calculating section 33 multiplies the percentage of the text data phoneme conversion accumulated value TN of each of the divided text data DTD, which has been calculated by itself, by 100, and stores the multiplied values, which are associated with the serial numbers TT of the divided text data DTD, as an accumulated value of the phonemes shown in FIG. 5, in the storing unit 20.

When the text data phoneme conversion accumulated values TN of all of the divided text data DTD are stored in the storing unit 20, the text data converting process S1 is completed.

Figure 6:
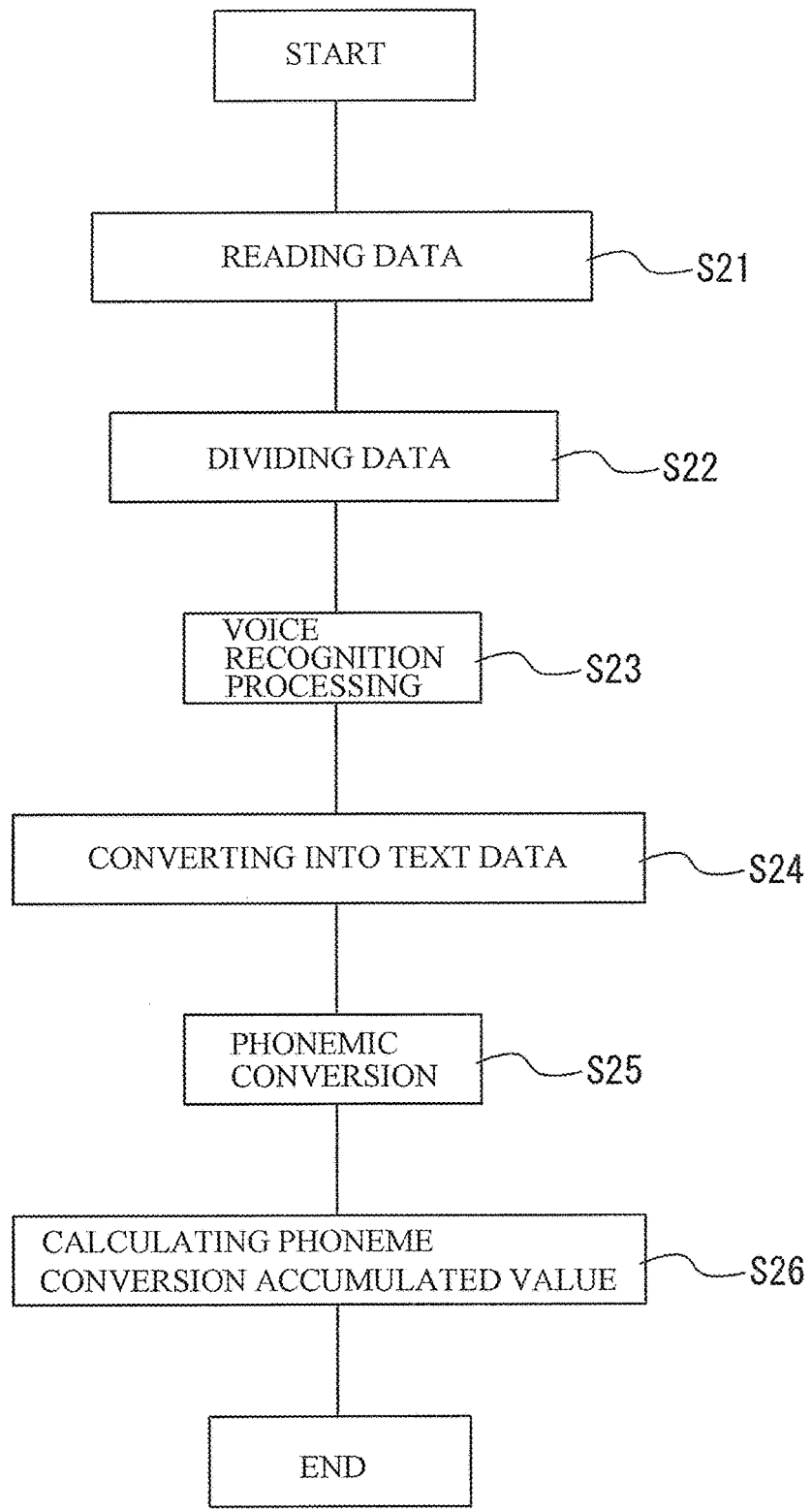
FIG. 6 is a detailed part of the flow chart shown in FIG. 2, which shows a process of converting voice data.

Next, processing the voice data SD will be explained. FIG. 6 is a flowchart of converting the voice data. A purpose of the reading data converting process S2 is to extract separating positions of the voice data SD (i.e., to divide at separation candidate positions).

Firstly, the CPU 30 reads the voice data SD from the storing unit 20 through the data inputting means 50 (step S21).

A voice data dividing section 34 of the CPU 30 suitably divides the voice data SD read from the storing unit 20 (step S22). In the present embodiment, silent segments in the voice data SD are extracted so as to extract dividing positions (separating positions) where the voice data SD will be divided into phrases.

More precisely, the voice data dividing section 34 firstly converts the voice data SD into voice waveform data. Then, the voice data dividing section 34 extracts silent parts of the voice data SD, which have been converted into the voice waveform data and which satisfy conditions defined by silent segment decision data MJD, as silent segments, on the basis of the silent segment decision data MJD.

The voice data dividing section 34 divides the voice data SD in ranges, each of which is segmented by two continuous silent segments. So as to produce divided voice data DSD. Further, the voice data dividing section 34 stores the divided voice data DSD, with serial numbers ST acting as identifiers which indicate order of division, in the storing unit 20, as shown in FIG. 7.

Preferably, the silent segment decision data MJD are numeric values, which have been predetermined by, for example, a user, and stored in the storing unit 20. The silent segment decision data MJD can be read, from the storing unit 20, by the voice data dividing section 34.

Concretely, the silent segment decision data MJD are constituted by a minimum value of voice output, duration of voice output whose power is lower than the minimum value, etc. The silent segment decision data MJD may be suitably inputted, by the user, through the data inputting means 50 every time the voice data dividing section 34 extracts the separating position of the voice data SD.

Successively, a voice data phoneme converting section 35 of the CPU 30 reads the divided voice data DSD from the storing unit 20 and sorts the read data in the division order of the associated serial numbers ST. Next, the voice data phoneme converting section 35 performs voice recognition processing of the divided voice data DSD by using known software for voice recognition processing (step S23). As to the divided voice data DSD, the data form is converted from voice data form to text data form (step S24), so that the divided voice data DSD whose data form is non-text data form can be changed to the text data form.

Next, the voice data phoneme converting section 35 phonemically converts the divided voice data DSD whose data form has been changed to the text data form (step S25).

Concretely, the voice data phoneme converting section 35 of the present embodiment converts the divided voice data DSD, whose data form has been changed to the text data form, into kana-letters, and counts number of the converted kana-letters as numbers SON of voice data phonemes which are voice data phoneme conversion values. The voice data phoneme converting section 35 stores the voice data phoneme numbers SON in the storing segment 20 in a state where the numbers SON correspond to the divided voice data DSD as shown in FIG. 7. In the present embodiment, the phoneme conversion processing of the divided voice data DSD can be performed as well as the phoneme conversion processing of the divided text data DTD performed by the text data phoneme converting section 32.

Next, a voice data phoneme conversion accumulated value calculating section 36 of the CPU 30 calculates voice data phoneme conversion accumulated values SN, which are voice data phoneme conversion accumulated values of the divided voice data DSD, on the basis of the voice data phoneme numbers SON (step S26). The calculated voice data phoneme conversion accumulated values SN are stored, with the serial numbers ST of the divided voice data DSD, in the storing unit 20 as shown in FIG. 7.

In the present embodiment, the voice data phoneme conversion accumulated value calculating section 36 calculates percentage of the calculated voice data phoneme conversion accumulated values SN to a total value of the calculated voice data phoneme conversion accumulated values SN, to the second decimal point. Further, the voice data phoneme conversion accumulated value calculating section 36 multiplies the percentage by 100, and stores the multiplied values in the storing unit 20. Since the calculated voice data phoneme conversion accumulated values SN are finally integer-processed, a data processing speed of the computer can be increased.

When the calculated voice data phoneme conversion accumulated values SN with respect to all of the divided voice data DSD are stored (e.g., when the voice data phoneme conversion accumulated value calculating section 36 completely processes the divided voice data DSD with respect to the phoneme conversion accumulated value of 10000), the reading data converting process S2 is completed.

Note that, the data format of the calculated voice data phoneme conversion accumulated values SN is not limited to that of the present embodiment. For example, the percentage with respect to the total value of the calculated voice data phoneme conversion accumulated values SN may be calculated to the third decimal point, and the percentage may be multiplies by 1000. By increasing number of digits of the calculated voice data phoneme conversion accumulated values SN, data processing can be performed more precisely.

The text data phoneme conversion accumulated value TN of the text data TD and the calculated voice data phoneme conversion accumulated values SN (see FIG. 7) of the voice data SD (the divided voice data DSD), which are obtained by the above described manner, respectively indicate: the separating position on a termination side; and candidate positions of the termination side separating position of each phrase. Therefore, the separating positions of the text data TD and the voice data SD can be automatically roughly extracted and preliminary determined.

After the separating positions and the candidate positions thereof of the phrases of the text data TD and the voice data SD are obtained, a phrase corresponding data producing section 37 synchronizes the phrases of the divided text data DTD with the phrases of the divided voice data DSD corresponding to those of the divided text data DTD (step S3).

Figure 8:
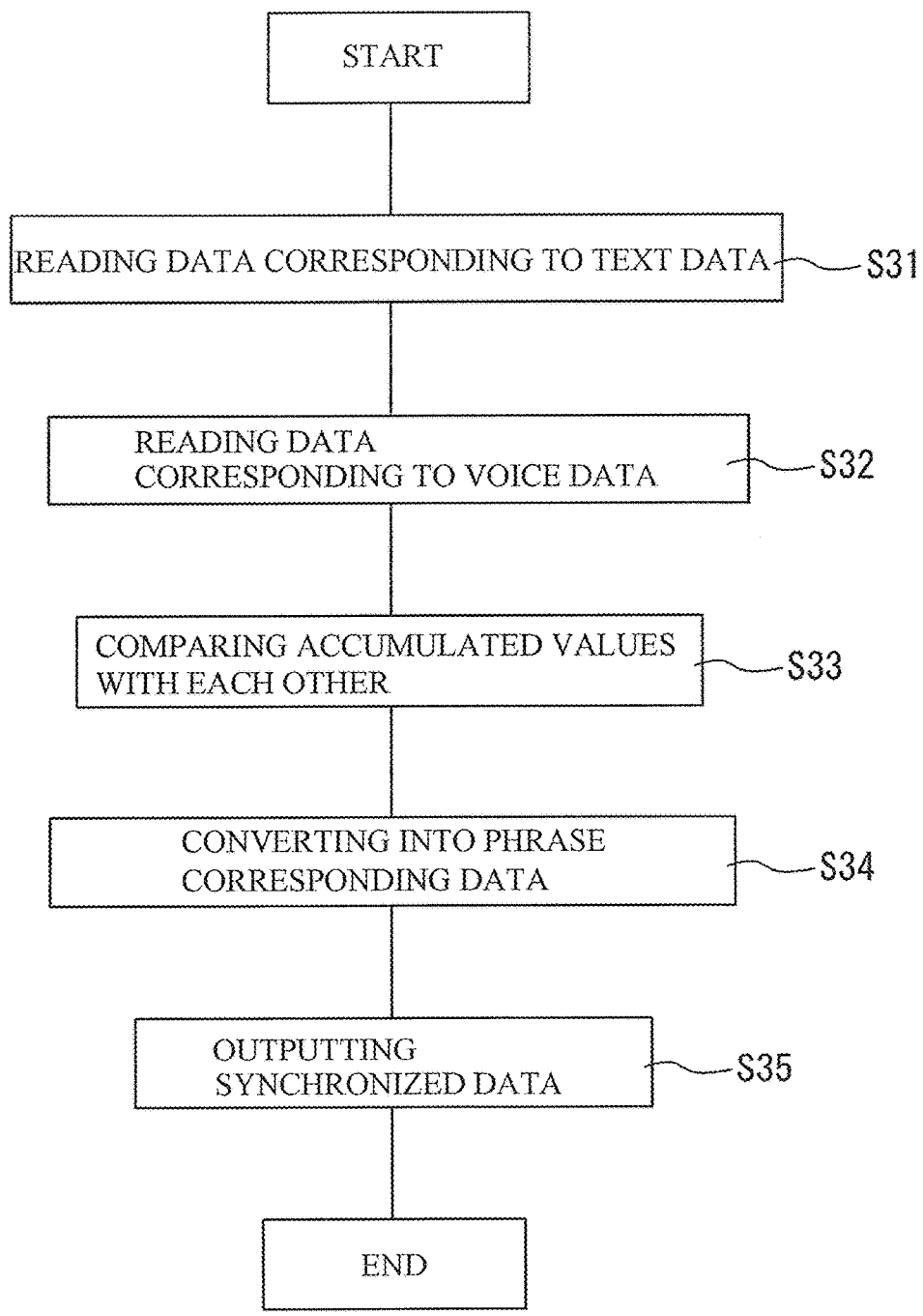
FIG. 8 is a detailed part of the flow chart shown in FIG. 2, which shows a process of synchronous processing.

FIG. 8 is a flow chart showing a process of the phrase synchronous processing performed by the phrase corresponding data producing section 37.

Firstly, the CPU 30 reads a set of data, which correspond to the divided text data DTD shown in FIG. 5, from the storing unit 20 (step S31). Next, the CPU 30 reads a set of data, which correspond to the divided voice data DSD shown in FIG. 7, from the storing unit 20 (step S32). Note that, the order of performing the processes of the steps S31 and S32 may be reversed.

Figure 9:
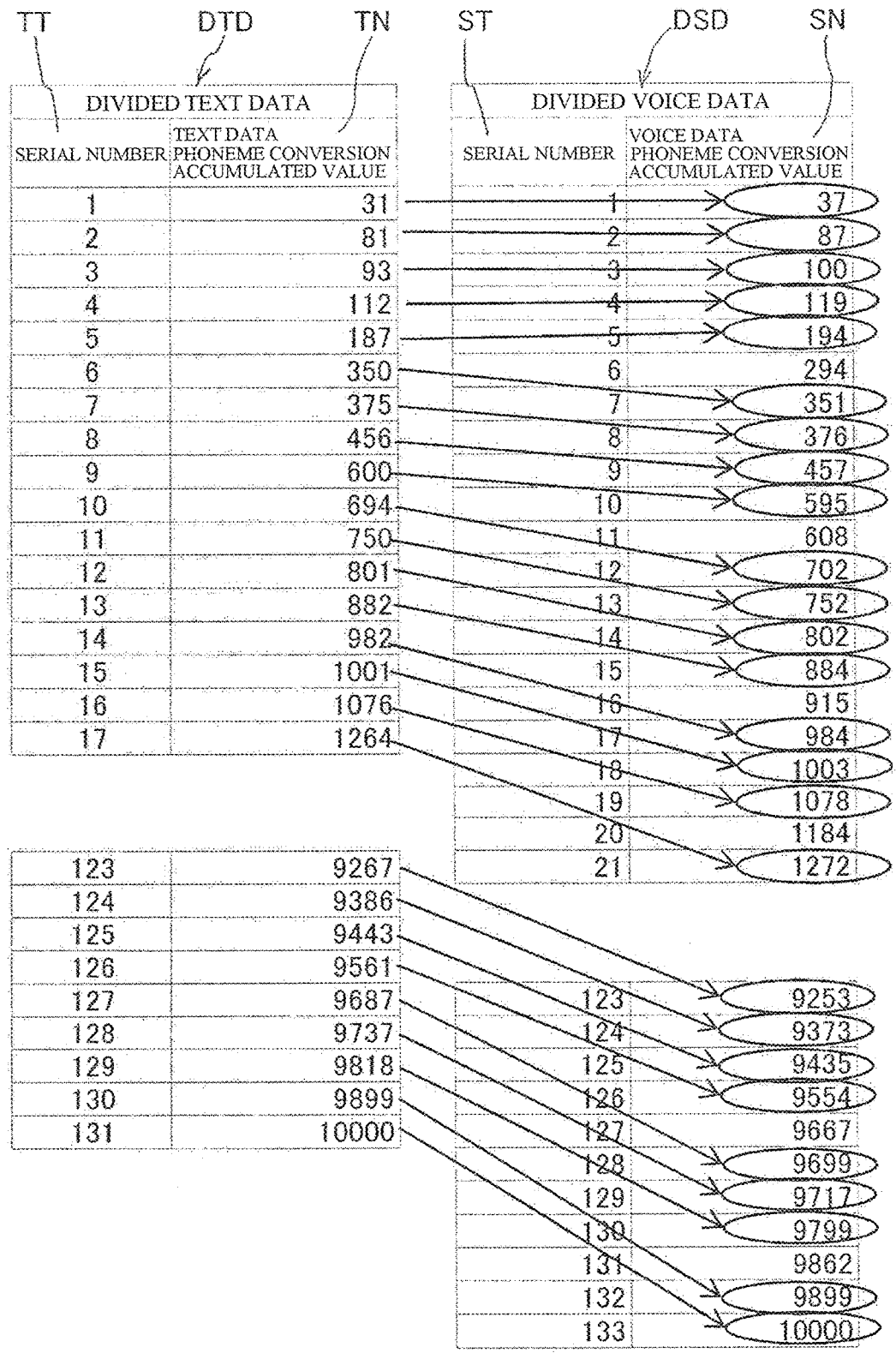
FIG. 9 is an explanation table, in which a part of the divided text data shown in FIG. 5 is compared with a part of the divided voice data shown in FIG. 7.

The phrase corresponding data producing section 37 of the CPU 30 extracts the serial numbers TT of the divided text data DTD and the text data phoneme conversion accumulated values TN from the set of data corresponding to the divided text data DTD shown in FIG. 5. Further, the phrase corresponding data producing section 37 extracts the serial numbers ST of the divided voice data DSD and the voice data phoneme conversion accumulated values SN from the set of data corresponding to the divided voice data DSD shown in FIG. 7. As shown in FIG. 9, the extracted data are divided into a table of the divided text data DTD (two rows on the left side) and a table of the divided voice data DSD (two rows on the right side).

Successively, the phrase corresponding data producing section 37 determines the serial numbers ST of the produced divided voice data DSD to be synchronized with the serial numbers TT of the divided text data DTD, which are shown in FIG. 9. Concretely, the text data phoneme conversion accumulated values TN of the divided text data DTD are compared with the voice data phoneme conversion accumulated values SN of the divided voice data DSD (step S33).

The step will be more precisely explained.

Firstly, the phrase corresponding data producing section 37 calculates a difference between a text data phoneme conversion accumulated value TN1, which corresponds to the serial number TT=1 of the table of the divided text data DTD, and a voice data phoneme conversion accumulated value SN1, which corresponds to the serial number ST=1 of the table of the divided voice data DSD, and the absolute value of the difference is defined as A1. Next, the phrase corresponding data producing section 37 calculates a difference between the text data phoneme conversion accumulated value TN1, which corresponds to the serial number TT=1 of the table of the divided text data DTD, and a voice data phoneme conversion accumulated value SN2, which corresponds to the serial number ST=2 of the table of the divided voice data DSD, and the absolute value of the difference is defined as A2. Further, the phrase corresponding data producing section 37 calculates a difference between the text data phoneme conversion accumulated value TN1, which corresponds to the serial number TT=1 of the table of the divided text data DTD, and a voice data phoneme conversion accumulated value SN3, which corresponds to the serial number ST=3 of the table of the divided voice data DSD, and the absolute value of the difference is defined as A3.

The phrase corresponding data producing section 37 compares the text data phoneme conversion accumulated value TN, which corresponds to the serial number TT of the table of the divided text data DTD, with the voice data phoneme conversion accumulated values SN, which correspond to at least three serial numbers ST of the table of the divided voice data DSD. Then, the voice data phoneme conversion accumulated value SN (the serial number ST) of the table of the divided voice data DSD, whose absolute value is the minimum among the absolute values A1 to A3 each of which is the difference between the text data phoneme conversion accumulated value TN and the voice data phoneme conversion accumulated value SN, is defined as the first separating position of the divided voice data DSD.

The serial number TT=1 of the table of the divided voice data DSD will be explained. In FIG. 9, the absolute value A1 is 31−37=|6|; the absolute value A2 is 31−87=|56|; and the absolute value A3 is 31−100=|69|. Therefore, the separating position associated with the serial number ST=1 of the divided voice data DSD corresponds to the separating position associated with the serial number TT=1 of the divided text data DTD. Then, the phrase corresponding data producing section 37 makes the serial number ST=1 of the divided voice data DSD associate with (correspond to) the serial number TT=1 of the divided text data DTD as a phrase corresponding datum FD1 and stores the datum in the storing unit 20 (step S34).

Next, the phrase corresponding data producing section 37 compares the text data phoneme conversion accumulated value TN2, which corresponds to the serial number TT=2 of the table of the divided text data DTD shown in FIG. 9, with at least three voice data phoneme conversion accumulated value SN2 to SN4, which correspond to the serial number at and after TT=2 of the table of the divided voice data DSD, as well as the above described manner. Note that, at and after the serial number TT=2 of the divided text data DTD, the phrase corresponding data producing section 37 compares the text data phoneme conversion accumulated value TN2 of the divided text data DTD, which corresponds to the serial number TT=2, with at least voice data phoneme conversion accumulated value SN2 to SN4, which respectively correspond to the serial number ST=2 to 4 of the divided voice data DSD. Phrase corresponding data FDn (n is a natural number of two or larger) are determined according to absolute values of the differences from the text data phoneme conversion accumulated value TN2. A concreter manner will be explained.

In case that the absolute values A2 to A4, which are calculated as well as the above described values A1 to A3, are A2<A3<A4, the phrase corresponding data producing section 37 makes the serial number ST=2 of the divided voice data DSD correspond to the serial number TT=2 of the table of the divided text data DTD as a phrase corresponding datum FD2 and stores the datum in the storing unit 20. If the text data phoneme conversion accumulated value TN and the voice data phoneme conversion accumulated value SN are the nearest of all (i.e., the absolute value A2 being minimum), there is a high possibility that there is a common separating position of the divided text data DTD and the divided voice data DSD.

In case that the absolute values A2 to A4 are A2>A3<A4, the phrase corresponding data producing section 37 makes the serial number ST=3 of the divided voice data DSD correspond to a separating position of the serial number TT=2 of the table of the divided text data DTD. If the text data phoneme conversion accumulated value TN and the voice data phoneme conversion accumulated value SN are the nearest of all (i.e., the absolute value A3 being minimum), there is a high possibility that there is a common separating position of the divided text data DTD and the divided voice data DSD.

Further, in case that the absolute values A2 to A4 are A2>A3>A4, the phrase corresponding data producing section 37 calculates absolute values A5, A6 . . . , which respectively correspond to the serial numbers at or after TT=5. The phrase corresponding data producing section 37 compares the present absolute value An with the previous absolute value A(n-1) and repeats the comparison, every time the absolute value is additionally calculated, until the current absolute value An is larger than the previous absolute value A(n-1).

In this case, the text data phoneme conversion accumulated value TN and the voice data phoneme conversion accumulated value SN are mutually the nearest at the separating position of the serial number ST=(n-1) of the table of the divided voice data DSD with respect to the separating position of the serial number TT=2 of the table of the divided text data DTD, the position of the serial number ST=(n-1) of the table of the divided voice data DSD is the most possible separating position. Therefore, the phrase corresponding data producing section 37 produces the phrase corresponding datum FD2 corresponding to the serial number ST=(n-1) of the table of the divided voice data DSD with respect to the serial number TT=2 of the table of the divided text data DTD and stores the datum in the storing unit 20.

If the absolute value An of the serial number ST=n (n is a natural number) of the table of the divided voice data DSD with respect to the serial number TT=x (x is a natural number) of the table of the divided text data DTD is zero, the phrase corresponding data producing section 37 may produce the phrase corresponding data FDx corresponding to the serial numbers ST=n of the table of the divided voice data DSD with respect to the serial numbers TT=x of the table of the divided text data DTD and store the data in the storing unit 20.

The phrase corresponding data producing section 37 repeatedly performs the data processing on the basis of the text data phoneme conversion accumulated value TN and the voice data phoneme conversion accumulated value SN, so that the most suitable separating positions of the divided voice data DSD with respect to the separating positions of the table of the divided text data DTD, i.e., basic data, can be selected. The phrase corresponding data producing section 37 once completes the process of producing the phrase corresponding data when the phrase corresponding data FD for the serial number TT corresponding to the text data phoneme conversion accumulated value TN is 10000.

After producing the phrase corresponding data FD1 to FDn, which respectively correspond to all of the serial numbers TT of the divided text data DTD, the CPU 30 reads the phrase corresponding data FD1 to FDn shown in FIG. 10, in order, from the storing unit 20. Next, the CPU 30 outputs the divided text data DTD and the divided voice data DSD, which are associated with the phrase corresponding data FDx, from the speaker 42 and the display 44, in a state where the divided text data DTD and the divided voice data DSD are synchronized with each other (step S35). Therefore, the user can confirm output results outputted from the speaker 42 and the display 44. The user can precisely adjust the synchronous processing of the text data TD and the voice data SD, by a known manner, if required. Therefore, the synchronous processing of the text data TD and the voice data SD can be completed.

In the present embodiment, most of the phrase corresponding data FD, which are produced by synchronizing the separating positions of the text data TD with those of the voice data SD, can be automatically produced, so that workload of the synchronous processing can be made much lower than the conventional technology.

Second Embodiment

The phrase corresponding data producing section 37 of the first embodiment regards the serial numbers ST=3 or more of the table of the divided voice data DSD only as comparison objects, with respect to the serial number TT=2 of the table of the divided text data DTD, when the separating position of the serial number ST=2 of the table of the divided voice data DSD with respect to the serial number TT=1 of the table of the divided text data DTD. This data processing is convenient for efficiently processing data. However, in some cases, failure will occur in the produced phrase corresponding data FD according to configuration contents of the text data TD and the voice data SD.

In case of producing correct phrase corresponding data FD, it is preferable to always select the comparison objects from the voice data phoneme conversion accumulated value SN corresponding to the first serial number ST with respect to the text data phoneme conversion accumulated values TN corresponding to the serial numbers TT when extracting the calculated voice data phoneme conversion accumulated values SN of the serial numbers ST of the divided voice data DSD, which correspond to the text data phoneme conversion accumulated values TN of the serial numbers TT of the divided text data DTD.

However, in case of employing such manner for producing the phrase corresponding data FD, the text data phoneme conversion accumulated values TN of the serial numbers TT of the table of the divided text data DTD will be associated with (corresponded to) the calculated voice data phoneme conversion accumulated values SN of the serial numbers ST of one the divided voice data DSD according to a set value of the silent segment decision data MJD is large, especially, in case that duration of voice output, whose power is lower than the minimum value, is long.

Figure 11:
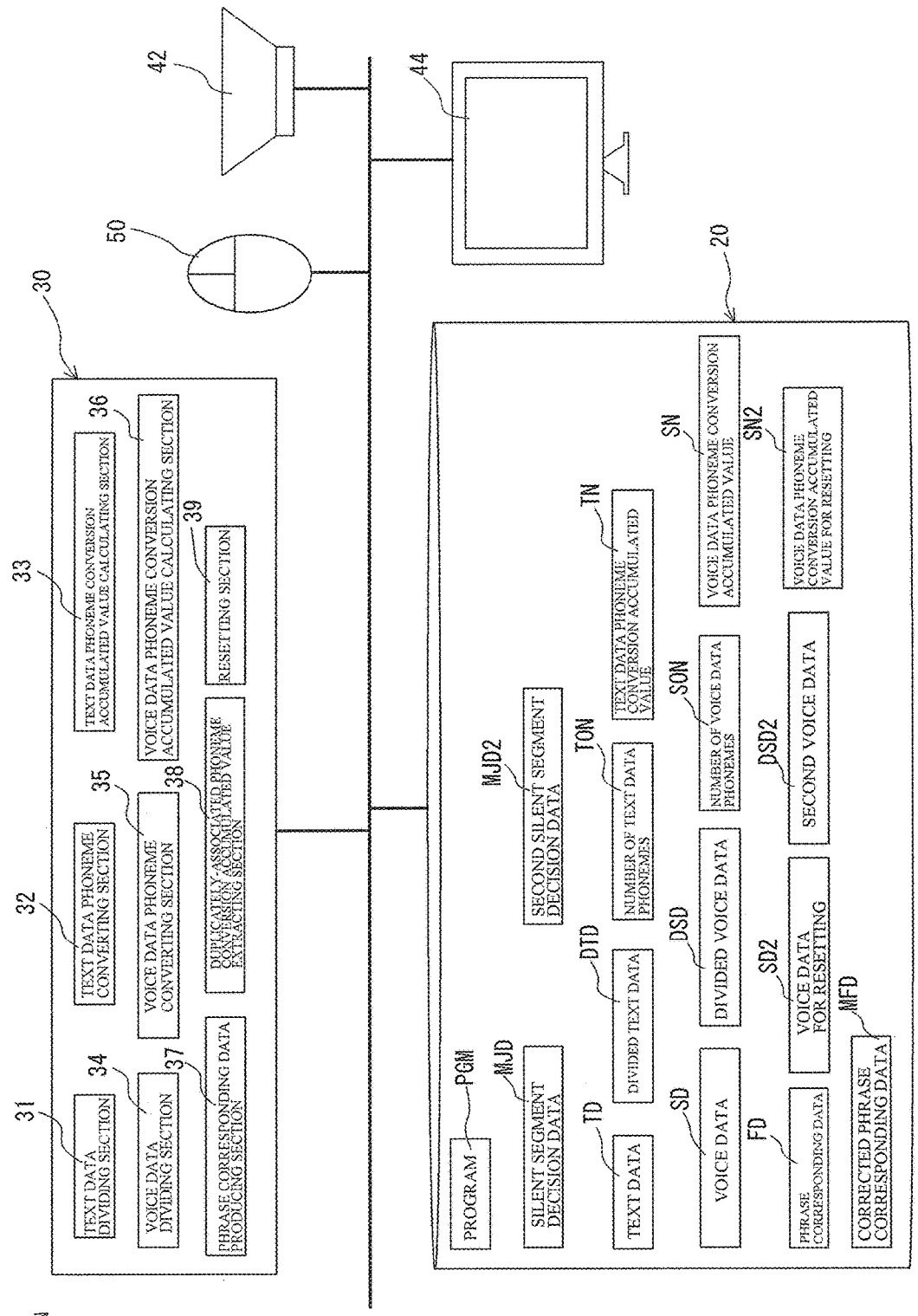
FIG. 11 is a block diagram of an apparatus of a second embodiment, which is capable of synchronously processing text data and voice data, showing a schematic structure.

In the present embodiment, a manner of eliminating duplication of the calculated voice data phoneme conversion accumulated value SN (the serial number ST) and the text data phoneme conversion accumulated values TN (the serial number TT), which is performed when the above described failure occurs, will be explained. FIG. 11 is a block diagram of the apparatus of the second embodiment, which is capable of synchronously processing the text data and the voice data, showing a schematic structure. FIG. 12A shows a main part of the table of the divided text data DTD, and FIGS. 12B and 12C show main parts of the table of the divided voice data DSD. Note that, the structural elements described in the first embodiment are assigned the same symbols, and detailed explanation thereof will be omitted.

A duplicately-associated phoneme conversion accumulated value extracting section 38 of the CPU 30 detects existence of duplication of the calculated voice data phoneme conversion accumulated values SN (the serial numbers ST of the divided voice data DSD) in the phrase corresponding data FD. Only in case that the duplicately-associated phoneme conversion accumulated value extracting section 38 detects that a plurality of the voice data phoneme conversion accumulated values SN (the serial numbers ST of the divided voice data DSD) are associated with the serial number TT of the text data phoneme conversion accumulated values TN in the phrase corresponding data FD, the CPU 30 performs functions of a resetting section 39.

A resetting process will be explained with reference to FIG. 12A-12C. The resetting section 39 of the CPU 30 extracts: the text data phoneme conversion accumulated values TN (or the serial numbers TT) in the phrase corresponding data FD; and the phrase corresponding data FD in which the voice data phoneme conversion accumulated values SN (the serial numbers ST) are duplicated, if the duplication is detected.

As shown in FIG. 12A, both of the phrase corresponding data FD5 and FD6 are associated with the voice data phoneme conversion accumulated values SN=1461 (ST=14), so the resetting process for eliminating the duplicate association of the phrase corresponding data FD5 and FD6 with the voice data phoneme conversion accumulated values SN=1461 (ST=14) is performed.

The resetting section 39 integrates the serial numbers from ST=13, which is one number before the serial number being associated with the phrase corresponding data FD5 and FD6, to ST=15, which is one number after said serial number, i.e., ST=13-15, in the order of the serial numbers, so as to produce voice data SD2 for resetting, which are used in a resetting segment.

Next, the resetting section 39 produces second silent segment decision data MJD2 by multiplying the set value of the silent segment decision data MJD stored in the storing unit 20 by predetermined coefficients. The second silent segment decision data MJD2 is obtained for extracting silent segments under a condition more limited than that of the silent segment decision datum MJD. For example, when the coefficient of the minimum value of voice output is defined as 1, the coefficient of the duration of voice output whose power is lower than the minimum value may be 0.5. In this case, the silent segments can be extracted under said condition in which only the duration of voice output whose power is lower than the minimum value is shortened, in spite that conditions of voice output values are equal.

In the above described manner, the resetting section 39 produces the second silent segment decision data MJD2 on the basis of the silent segment decision datum MJD and the coefficients stored in the storing unit 20, but the present invention is not limited to the above described manner. For example, the user may directly input the coefficients for items of the silent segment decision datum MJD or the second silent segment decision data MJD2, and the second silent segment decision data MJD2 may be previously stored in the storing unit 20. Namely, the second silent segment decision data MJD2 are used so as to set the condition for securely extracting the silent segments which have not been extracted by using the silent segment decision datum MJD from the voice data SD2 for resetting.

Successively, the resetting section 39 converts the voice data SD2 for resetting into voice waveform data and extracts second silent segments, on the basis of the second silent segment decision data MJD2, from the voice data SD2 for resetting (i.e., a part of the voice data corresponding to the serial numbers ST=13 to 15 assigned on the basis of the second silent segment decision data MJD2). The second silent segments can be extracted by using the silent segment decision data MJD as well as the first embodiment, so detailed explanation will be omitted.

Next, the resetting section 39 assigns second serial numbers SST to second divided voice data DSD2, each of which is divided by second silent segments in the order of extraction, performs the phonemic processing, and calculates number SON2 of phoneme of the second serial numbers SST and phoneme conversion accumulated values SSN. Each of the values calculated in the present embodiment are shown in FIG. 12B.

Further, the resetting section 39 corrects the serial numbers ST of the divided voice data DSD in the resetting segments on the basis of the data shown in FIG. 12B. Increase of the serial numbers in the resetting segments before the resetting process is two. On the other hand, the second serial numbers SST are 1, 2 and 3. Namely, one separating position of the divided voice data DSD is increased by the current resetting process.

Next, the resetting section 39 adds the voice data phoneme conversion accumulated value SN2=134 of the second serial number SST=1 to the voice data phoneme conversion accumulated value SN=1327 of the minimum serial number ST=13 of the data before the resetting process, so that the voice data phoneme conversion accumulated value SN2=1461 of the new serial number ST=14 is obtained. The resetting section 39 further performs the calculation for the second serial numbers SST=2 and SST=3 as well, so that corresponding data of the voice data phoneme conversion accumulated value SN2 of the new serial numbers ST2=13-16 of the resetting segments can be obtained (see FIG. 12C).

Next, the resetting section 39 performs correction processing for the serial numbers TT=5 and TT=6 of the text data. The text data phoneme conversion accumulated values TN of the serial numbers TT=5 and TT=6 of the text data are compared with the voice data phoneme conversion accumulated values SN2 for the resetting process, which are shown in FIG. 12C. The text data phoneme conversion accumulated values TN of the serial numbers TT=5 and TT=6 of the text data and the voice data phoneme conversion accumulated values SN2 for the resetting process can be compared with each other by the manner of comparing the phoneme conversion accumulated values, which has been described in the first embodiment. Therefore, detailed explanation will be omitted.

In the present embodiment, the new serial numbers ST2=14 and the voice data phoneme conversion accumulated values SN2=1461 in the resetting segment shown in FIG. 12C correspond to the serial numbers TT=5 and TN=1435 of the divided text data DTD; and the new serial numbers ST2=15 and the voice data phoneme conversion accumulated values SN2=1500 correspond to the serial numbers TT=6 and TN=1483. Therefore, the duplication of the voice data phoneme conversion accumulated values SN with respect to the serial numbers TT can be eliminated.

Since the resetting section 39 resets the phrase corresponding data FD, the separating positions of the voice data is increased (one separating position, i.e., the new serial numbers ST2=15 and SN=1500 shown in FIG. 12, is added). Therefore, the serial numbers ST of the divided voice data DSD, which will be corresponded to the serial numbers TT of the divided text data DTD, in a part of the phrase corresponding data FD are changed. Changing the serial numbers TT and ST of the phrase corresponding data FD are also performed by the resetting section 39.

The resetting section 39 adds the increasing number of the separating position increased by the resetting process, i.e., one, to the serial numbers ST of the divided voice data DSD (e.g., ST=15 or more in the present embodiment), which exist immediately after the resetting segment, so as to correct the serial numbers ST of the divided voice data DSD, which correspond to the serial numbers TT=7 or more. The resetting section 39 integrates: a part of the phrase corresponding data FD before the resetting segment (e.g., a part of the serial numbers TT=1 to 4 in the divided text data DTD); a part of the divided text data DTD, which have been corrected in the resetting segment and which correspond to the serial numbers TT=5 and TT=6; and a part of the phrase corresponding data FD after the resetting segment (e.g., a part of the serial numbers TT=7 or more in the divided text data DTD). Further, the resetting section produces the text data phoneme conversion accumulated values TN (the serial numbers TT of the separating positions) of the divided text data DTD and corresponding data (original data of corrected phrase corresponding data MFD), which correspond to the voice data phoneme conversion accumulated values SN (the serial numbers ST of the separating positions), and stores the corresponding data in the storing unit 20. The obtained data are shown in FIG. 13. The resetting section 39 produces the corrected phrase corresponding data MFD on the basis of the corresponding data shown in FIG. 13 and stores them in the storing unit 20.

As described above, the process of changing the separating positions in the voice data SD is performed only in the suitable segment (the resetting segment), so that a processing time for changing the separating positions of the voice data SD within the resetting segment can be made much shorter than that for changing the entire voice data SD. Further, highly reliable phrase corresponding data FD, in which concordance rate (synchronous rate) of the separating positions of the text data TD and the voice data SD is high, can be produced.

Third Embodiment

After performing the resetting process described in the second embodiment, the duplication of the voice data phoneme conversion accumulated values SN (or the serial numbers ST) of the voice data SD in the corrected phrase corresponding data MFD still exist according to conditions of the second silent segment decision data MJD2. In the present embodiment, an example for eliminating such duplication will be explained.

Concretely, a forcible processing section 39A, which forcibly sets the separating positions in the duplicating parts of the voice data phoneme conversion accumulated values SN (or the serial numbers ST) of the voice data SD in the corrected phrase corresponding data MFD, will be explained.

As shown in FIG. 14, the CPU 30 acts as the forcible processing section 39A of the present embodiment. A forcible process performed by the forcible processing section 39A will be explained.

In the second embodiment, after producing the corrected phrase corresponding data MFD, the duplicately-associated phoneme conversion accumulated value extracting section 38 reconfirms if the duplication of the voice data phoneme conversion accumulated values SN exists in the corrected phrase corresponding data MFD or not.

In case that the reconfirmation to the corrected phrase corresponding data MFD is performed and that associating a plurality of the text data phoneme conversion accumulated values TN (the serial numbers TT) with the same voice data phoneme conversion accumulated value SN (the serial number ST), i.e., duplication of the voice data phoneme conversion accumulated value SN, is detected, the CPU 30 extracts a condition-corresponding part from the corrected phrase corresponding data MFD and stores an extracted segment of the corrected phrase corresponding data MFD, in the storing unit 20, as forcibly-setting data PFD, which are the second divided voice data DSD2. FIGS. 15A and 15B show contents of the data in the extracted segment of the corrected phrase corresponding data MFD, in which separated segments are forcibly set by the forcible processing section 39A.

As shown in FIG. 15A, both of text data phoneme conversion accumulated values TN13=700 and TN14=800 (or serial numbers TT13 and TT14) are phrase corresponding data FD13 and FD14, which correspond to a voice data phoneme conversion accumulated value SN17=798 (or a serial number ST17). In FIGS. 15A and 15B, the text data phoneme conversion accumulated values, which respectively correspond to the serial numbers TT12, TT13 and TT14, are 600, 700 and 800. Further, a difference between the accumulated value SN17=798 of the serial number ST17 and the accumulated value SN16=598 of the previous serial number ST16 is 200.

In this state, the forcible processing section 39A calculates a difference between the text data phoneme conversion accumulated values TN13 and TN12 and a difference between the text data phoneme conversion accumulated values TN14 and TN13, and proportionally distributes the value 200, which is the difference between the accumulated value SN17 of the serial number ST17 and the accumulated value SN16 of the previous serial number ST16. In the present embodiment, 100 is added to the voice data phoneme conversion accumulated value SN16=598 of the serial number ST16, the total 698 becomes the voice data phoneme conversion accumulated value SN of the serial number ST17, and the voice data phoneme conversion accumulated value SN=698 is forcibly made as the separating position on the basis of the voice data SD corresponding to the serial number TN13. Further, the forcible processing section 39A adds 100 to the voice data phoneme conversion accumulated value SN=698 of the serial number TN13, the total value 798 becomes the voice data phoneme conversion accumulated value SN of the serial number ST18, and the voice data phoneme conversion accumulated value SN=798 is forcibly made as the separating position on the basis of the voice data SD corresponding to the serial number TN14.

Successively, the forcible processing section 39A corrects the serial numbers ST by adding number of the separating position forcibly added, e.g., one, to numbers of the serial number ST=18 or more. Note that, a manner of correcting the serial numbers ST is same as that described in the second embodiment, so detailed explanation will be omitted.

The forcible processing section 39A produces forcibly-corrected phrase corresponding data FFD by integrating the corrected phrase corresponding data MFD from the serial number ST=1 to the serial number ST=16 and the corrected phrase corresponding data MFD of the serial number ST=17, which corresponds to the separating position added by the forcible processing section 39A, or more. The forcibly-corrected phrase corresponding data FFD is stored in the storing unit 20. By storing the data FFD, a process of forcibly setting a separating position in a voice segment, to which the specific serial number ST of the divided voice data DSD is assigned, is completed.

The present embodiment is best characterized in that the separating position is forcibly added to the divided voice data DSD in response to number of phoneme (a length) of a phrase to be divided when the separating position corresponding to a separating position based on the divided text data DTD, which are basic data, is not detected in the divided voice data DSD, and that the duplicated part, in which the separating position of the divided text data DTD in the corrected phrase corresponding data MFD and that of the divided voice data DSD therein are duplicately assigned, is forcibly corrected.

The CPU 30 synchronously outputs the text data TD and the voice data SD on the basis of the text data phoneme conversion accumulated values TN, the voice data phoneme conversion accumulated values SN and the serial numbers TT and ST, which are associated with each other by the forcibly-corrected phrase corresponding data FFD, so that the user can confirm the synchronization state.

In the present embodiment, in case that no suitable silent segments are extracted from the voice data SD in spite of performing the process of extracting the silent segments a plurality of times, the repetitive processing can be efficiently omitted by forcibly setting the separating positions, in non-silent segments, in response to number of phoneme.

The embodiments of the present invention have precisely explained, but the scope of the present invention is not limited to the above described first to third embodiments. For example, some structural parts described in one embodiment may be applied to another embodiment.

For example, the voice data SD are once converted into text data for the phonemically conversion process in the above described embodiments, the process of converting the divided voice data DSD into text data is not an essential process. The phonemic processing may be performed by directly phonemically converting the divided voice data DSD (the voice data SD). By employing this manner, a time for converting the divided voice data DSD into the text data can be shortened.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alternations could be made hereto without departing from the spirit and scope of the invention.

What is claimed is:

1. An apparatus for synchronously processing text data and voice data, comprising:
    a storing unit that stores text data constituted by a plurality of phrases and voice data of the text data; and
    a central processing unit (CPU) which performs:
    dividing the text data stored in the storing unit into the phrases and storing the divided text data, with identifiers which respectively correspond to the divided text data and indicate the division order, in the storing unit;
    phonemically converting the divided text data, phrase by phrase, to obtain text data phoneme conversion values and storing the text data phoneme conversion values, which respectively correspond to the phrases, in the storing unit;
    calculating accumulated values of the text data phoneme conversion value of each phrase of the divided text data by calculating percentage of the text data phoneme conversion accumulated value TN of each of the phrases to the text data phoneme conversion accumulated value TN of the final phrase of the text data TD, to the second decimal point and by multiplying the percentage of the text data phoneme conversion accumulated value TN of each of the divided text data DTD by 100 and storing the accumulated values, which respectively correspond to the phrases of the divided text data, in the storing unit;
    extracting a silent segment, from the voice data, on the basis of a predetermined silent segment decision datum, dividing the voice data in the extracted silent segment, and storing the divided voice data, with identifiers which respectively correspond to the divided voice data and indicate the division order, in the storing unit;
    phonemically converting the divided voice data, which have been divided division range by division range, to obtain voice data phoneme conversion values and storing the voice data phoneme conversion values, which respectively correspond to the division ranges, in the storing unit;
    calculating accumulated values of the voice data phoneme conversion value of each division range of the divided voice data by calculating percentage of the calculated voice data phoneme conversion accumulated values SN to a total value of the calculated voice data phoneme conversion accumulated values SN, to the second decimal point and multiplying the percentage by 100 and storing the accumulated values, which respectively correspond to the division ranges of the divided voice data, in the storing unit;
    extracting the nearest approximate values of the voice data phoneme accumulated values with respect to the text data phoneme conversion accumulated values corresponding to the phrases of the divided text data, and producing phrase corresponding data, in which the voice data phoneme conversion accumulated values respectively corresponding to the phrases of the divided text data are associated with identifiers indicating playback order of the phrases of the divided text data; and
    outputting the corresponding phrases of the text data and the divided voice data, which correspond to each other, on the basis of the phrase corresponding data.

2. The apparatus according to claim 1, further comprising:
    detecting existence of duplicate association of the voice data phoneme conversion accumulated values in the phrase corresponding data; and
    resetting the phrase corresponding data so as to eliminate the duplicate association of the voice data phoneme conversion accumulated values in the phrase corresponding data, wherein the CPU defines all of the divided voice data, whose voice data phoneme conversion accumulated values are duplicately-associated, as resetting segment data when the duplicate association of the voice data phoneme conversion accumulated values is detected;

extracting a second silent segment, from the resetting segment data, on the basis of a second silent segment decision datum whose condition is more restricted than that of the silent segment decision datum;

producing second divided voice data, which are obtained by dividing the resetting segment data on the basis of a result of extracting the second silent segment;

calculating second phoneme conversion values, which are obtained by phonemically converting the divided segments of the second divided voice data, and calculating a voice data phoneme conversion accumulated value of the resetting segment data, which is accumulated, in division order, in the resetting segment data;

extracting the nearest approximate values of the voice data phoneme conversion accumulated values of the resetting segment data with respect to the text data phoneme conversion accumulated values corresponding to the phrases of the divided text data in the resetting segment data, and making the extracted values correspond to the phrases of the divided text data in the resetting segment data;

producing phrase corresponding data of the resetting segment, in which accumulated values of the divided voice data phoneme conversion in the resetting segment data are respectively corresponded to the phrases of the divided text data in the resetting segment data; and producing corrected phrase corresponding data by integrating the phrase corresponding data with the phrase corresponding data of the resetting segment on the basis of the identifiers in the divided text data.

3. The apparatus according to claim 2, wherein, when the CPU detects the duplicate association of the voice data phoneme conversion accumulated values of the resetting segment data in the corrected phrase corresponding data and wherein, the CPU performs:

producing forcible processing object data, which include the voice data phoneme conversion accumulated value of the resetting segment data from which the duplicate association has been detected by the CPU, the second divided voice data being corresponded thereto and the divided text data;

calculating a total value of the text data phoneme conversion values of the divided text data of the forcible processing object data, and calculating a ratio of the text data phoneme conversion values of the divided text data of the forcible processing object data to the total value;

forming forcibly-divided segments in the second voice data according to the calculated ratio of the text data phoneme conversion values, and calculating voice data phoneme conversion accumulated values of the resetting segments ire the forcibly-divided segments;

extracting voice data phoneme conversion accumulated values of the forcible process object data, each of which is the nearest to the text data phoneme conversion accumulated values of the phrases of the divided text data in the forcible process object data, and making the extracted values correspond to the phrases of the divided text data in the forcible process object data;

producing phrase corresponding data of the forcible process object data, in which the voice data phoneme conversion accumulated values in the forcible process object data are respectively associated with the phrases of the divided text data in the forcible process object data; and producing forcibly-corrected phrase corresponding data by integrating the phrase corresponding data, the phrase corresponding data in the resetting segments and the phrase corresponding data in the forcible process object data on the basis of the identifiers in the divided text data.

4. The apparatus according to claim 1, wherein the CPU converts the voice data into text data once by voice recognition processing, and phonemically converts the text data of the voice data.

5. The apparatus according to claim 2, wherein the CPU converts the voice data into text data once by voice recognition processing, and phonemically converts the text data of the voice data.

6. The apparatus according to claim 3, wherein the CPU converts the voice data into text data once by voice recognition processing, and phonemically converts the text data of the voice data.

* * * * *